A. LIGHTHEISER.

Meat Mincer.

No. 13,990. Patented Dec. 25, 1855.

UNITED STATES PATENT OFFICE.

ALEXANDER LIGHTHEISER, OF READING, PENNSYLVANIA.

IMPROVEMENT IN MACHINES FOR MINCING MEAT.

Specification forming part of Letters Patent No. 13,990, dated December 25, 1855.

*To all whom it may concern:*

Be it known that I, ALEXANDER LIGHTHEISER, of the city of Reading, in the county of Berks and State of Pennsylvania, have invented a new and useful Improvement on the Machine for Mincing Meat; and I do hereby declare that the following is a full, clear, and exact description of the construction and operation of the same, reference being had to the annexed drawings, making a part of this specification, in which—

Figure 1:
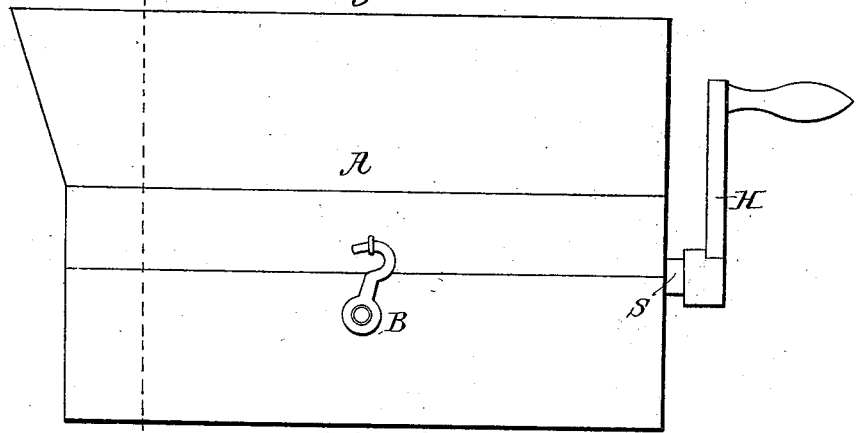
Figure 2:
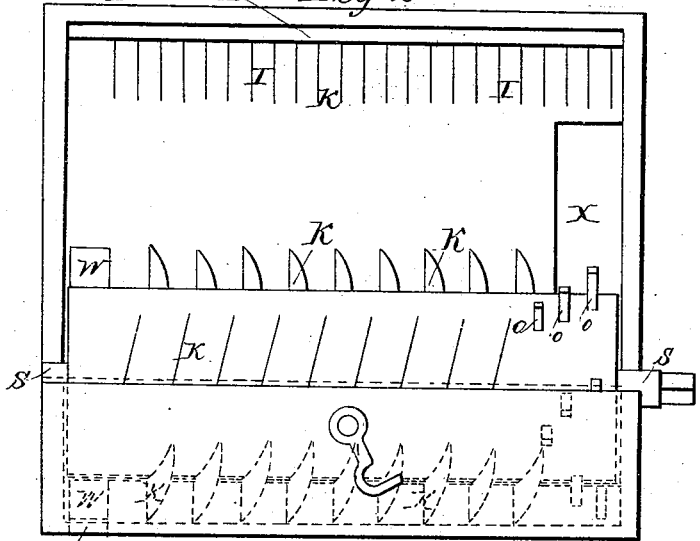
Figure 3:
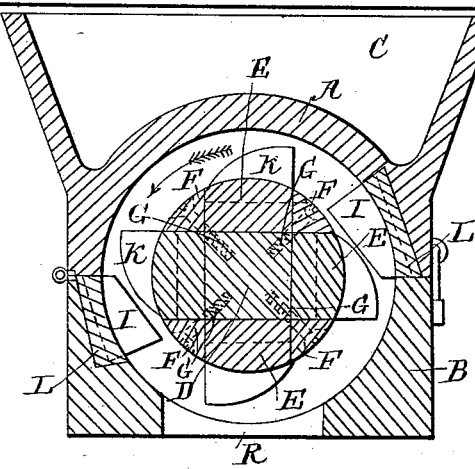

Figure 1 is a front elevation of the machine closed. Fig. 2 is a front view with the lid or upper half of the machine thrown open, showing the cylinder and knives; Fig. 3, an end section on the line A B, the letters of reference corresponding.

Fig. 1, A B is the upper and lower half of the box or casing. The upper half contains the hopper C. X is the feed-opening and R the discharge-opening.

L L, Fig. 2, are two pieces of hard wood running the entire length of the inside of the box, to which they are fastened. Said pieces are for the purpose of holding the stationary knives I I.

K K K K are the revolving knives, and are fastened into the pieces E E E E. These knives are fastened diagonally into the pieces E E E E, and which pieces are fastened to the square center piece D by means of the triangular pieces F F F F, secured to the center piece D by means of the screws G G G G. The cutting-edge of the knives K K K K is the segment of a circle, and their position on the cylinder is a double spiral.

S S are the journals of the cylinder.

W W are wiper-pieces for the purpose of wiping the minced meat through the discharge-opening R.

O O O are a series of spikes on the cylinder for the purpose of receiving and pressing into the knives K K K K I I I I the meat fed from the hopper C through the feed-opening X.

H is the crank-handle for operating the machine. By turning the handle in the direction of the arrow it will be observed that the revolving knives K K K K pass between the stationary knives I I I I, cutting the meat carried forward by the spikes O O O O.

I am aware that machines have been constructed in which the cutting action was or is produced by means of spikes on a solid cylinder operating against stationary knives. In such machines the cutting is very imperfect, from the fact that the spikes have no cutting action and carry the meat full onto the stationary knives, not giving it the sliding motion or the advantage of the segment-cutters that it receives in my machines.

I do not claim any particular shape for the cutting-edge of the knives or blades K K K; but

What I claim as my invention, and desire to secure by Letters Patent, is—

The placing of the knives or blades K K K in an inclined position on the surface of the cylinder for the purpose of propelling the meat through the machine.

ALEXANDER LIGHTHEISER.

Witnesses:
 MATTHIAS MAUGIE,
 SAML. R. SCHMUK.